United States Patent
Müller (10) Patent No.: US 7,736,717 B2
(45) Date of Patent: Jun. 15, 2010

(54) HONEYCOMB BODY WITH DOUBLE TUBULAR CASING

(75) Inventor: Hermann Josef Müller, Kürten-Spitze (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 909 days.

(21) Appl. No.: 11/405,206

(22) Filed: Apr. 17, 2006

(65) Prior Publication Data
US 2006/0233680 A1    Oct. 19, 2006

(30) Foreign Application Priority Data
Apr. 15, 2005  (DE) .................. 10 2005 017 725

(51) Int. Cl.
*B32B 3/12* (2006.01)
*B01D 50/00* (2006.01)

(52) U.S. Cl. ............... 428/116; 422/177; 502/527.12

(58) Field of Classification Search .............. 428/116, 428/117, 118, 119, 188, 913, 327, 73, 307.5, 428/34.5, 177, 304.4, 192; 501/118, 119, 501/120, 153, 154; 55/523, 585.3, 483, 502, 55/529; 264/177.12
See application file for complete search history.

(56) References Cited

U.S. PATENT DOCUMENTS

| | | | | |
|---|---|---|---|---|
| 3,905,775 A | * | 9/1975 | Sowards et al. | 422/180 |
| 4,948,774 A | * | 8/1990 | Usui et al. | 502/439 |
| 5,079,210 A | * | 1/1992 | Kaji et al. | 502/439 |
| 5,380,501 A | * | 1/1995 | Hitachi et al. | 422/180 |
| 6,040,064 A | * | 3/2000 | Bruck et al. | 428/593 |
| 2003/0091480 A1 | * | 5/2003 | Yamaguchi et al. | 422/179 |
| 2003/0147782 A1 | * | 8/2003 | Bruck et al. | 422/180 |
| 2004/0152595 A1 | | 8/2004 | Maus | |

FOREIGN PATENT DOCUMENTS

| | | |
|---|---|---|
| DE | 37 29 994 A1 | 3/1989 |
| DE | 38 34 403 A1 | 4/1990 |
| DE | 101 37 897 A1 | 2/2003 |
| JP | 2000-274233 A * | 10/2000 |

OTHER PUBLICATIONS

English Translation of DE 19900412 (German Patent).*

* cited by examiner

*Primary Examiner*—David R Sample
*Assistant Examiner*—Nicole T Gugliotta
(74) *Attorney, Agent, or Firm*—Laurence A. Greenberg; Werner H. Stemer; Ralph E. Locher (57) ABSTRACT

A honeycomb body includes a honeycomb structure through which a fluid can flow and which is disposed in a tubular casing that is substantially gas-impermeable in a radial direction. The tubular casing includes at least one inner tubular casing part and at least one outer tubular casing part, in which at least the outer tubular casing part has cutouts at least in a subregion. The tubular casing has a reduced weight as compared to standard tubular casings, yet nevertheless has the same mechanical stability and gas-tightness. It is also possible to form the tubular casing with thermal expansion properties which are adapted to a subsequent use.

7 Claims, 8 Drawing Sheets

HONEYCOMB BODY WITH DOUBLE TUBULAR CASING

BACKGROUND OF THE INVENTION

Field of the Invention

The present invention relates to a honeycomb body having a honeycomb structure through which a fluid can flow and which is accommodated in a double tubular casing.

Honeycomb bodies have cavities. A fluid can at least flow to and generally even through the cavities. Honeycomb bodies are used as catalyst carrier bodies for the treatment of exhaust gases. Such exhaust gases include exhaust gases in particular from internal combustion engines, which are used for example in vehicles (such as automobiles, motorcycles, boats, aircraft, quad bikes, trikes and the like) or in the stationary sector, for example in the exhaust system of a generator or in power plants. The honeycomb bodies include honeycomb structures which are held in tubular casings. Honeycomb structures can also be formed as particulate filters of open or closed construction (in particular diesel particulate filters with passages which are closed on alternate sides).

The tubular casings generally have to perform two functions. Firstly, they are intended to ensure that all of the exhaust gas flows through the honeycomb structure, and secondly they have to protect the honeycomb body or honeycomb structure from mechanical damage from the outside. Such damage can occur in a very wide range of ways, for example as a result of the impact of stones if the honeycomb body is used in a motor vehicle. Furthermore, it is also possible, for example, for a tool which slips when maintenance is being carried out to cause damage to the honeycomb body.

However, there is a need to save material during production, in particular of tubular casings. Furthermore, when such casings are used in mobile systems, it is advantageous for them to be as lightweight as possible. At the same time, however, gas-tightness and mechanical stability must not suffer from the reduction in the weight of the tubular casing.

SUMMARY OF THE INVENTION

It is accordingly an object of the invention to provide a honeycomb body with a double tubular casing, which overcomes the hereinafore-mentioned disadvantages of the heretofore-known devices of this general type, which on one hand ensures that all of the exhaust gas, as far as possible, flows through the honeycomb structure and which on the other hand reliably protects the honeycomb body from mechanical damage, while at the same time being as lightweight as possible.

With the foregoing and other objects in view there is provided, in accordance with the invention, a honeycomb body. The honeycomb body comprises a tubular casing being substantially gas-impermeable in a radial direction and including at least one inner tubular casing part and at least one outer tubular casing part. At least the outer tubular casing part has cutouts formed at least in a subregion. A honeycomb structure through which a fluid can flow, is disposed in the tubular casing.

In the present context, a cutout is to be understood as meaning in particular a region in which the material thickness of the tubular casing is reduced. In particular, an opening or aperture in the radial direction also constitutes a cutout in the sense of the present invention. According to the invention, it is advantageously possible for the inner tubular casing part to be produced in substantially gas-impermeable form from a material that is as thin as possible, while the outer tubular casing part is formed from a thicker material. In this way it is possible to produce a tubular casing which is both gas-impermeable and ensures mechanical stability, while at the same time being relatively lightweight. This is equally possible by virtue of both the inner tubular casing part and the outer tubular casing part having cutouts. In this way it is possible to reduce the weight of each tubular casing part. In this case, it is advantageous in particular if cutouts in the inner tubular casing part do not overlap cutouts in the outer tubular casing part, but rather bear against a continuous region without any cutouts in the respective other tubular casing part. In this way, on one hand the maximum possible gas-tightness is ensured in this case too, while on the other hand mechanical stability is achieved at a relatively low weight. In particular, the tubular casings are produced from material which is resistant to high-temperature corrosion, such as for example special steel. The honeycomb structure preferably includes passages through which a fluid, such as for example through which exhaust gas, can flow. A honeycomb structure of this type can be made from ceramic material, for example in the form of an extrudate. At the same time, it is also possible for the honeycomb structure to be built up from layers, for example by winding an at least partially structured layer and a substantially smooth layer together, so that the at least partially structured layer forms passages when it is in contact with the smooth layer. These layers may include both metallic layers and ceramic layers. In the context of the present invention, a layer is to be understood in particular as meaning a sheet-metal layer or a fiber layer. The honeycomb structure may be a standard catalyst carrier body, but as an alternative or in addition it is also possible for the honeycomb body to serve as a particulate filter or as a closed particulate trap. In the case of a closed particulate trap, it is customary for there to be passages which are closed on alternate sides, so that the exhaust gas flows into a passage and cannot leave the honeycomb body again through the same passage, but rather has to penetrate through a passage wall into an adjacent passage, so that the particulates contained in the exhaust gas are trapped in the porous passage wall.

In accordance with another feature of the invention, the honeycomb structure includes at least one at least partially structured metallic layer.

In this case, the honeycomb body may, for example, be helically wound, with in particular a single at least partially structured metallic layer, or with an at least partially structured layer and a substantially smooth layer being wound together. At the same time, however, it is also possible to produce stacks formed from at least partially structured foils and optionally substantially smooth layers and to intertwine one or more of these stacks in the same direction or in opposite directions.

In accordance with a further feature of the invention, the inner tubular casing part has a first material thickness and the outer tubular casing part has a second material thickness. A quotient of the first material thickness and the second material thickness is less than 1.

In particular if only the inner tubular casing part is formed without cutouts, it is possible to achieve a considerable saving in weight, since the gas-tightness is produced by the inner tubular casing part, which is formed without cutouts from a metal sheet of reduced material thickness as compared to the metal sheet used to form the outer tubular casing part. In particular, the quotient of the material thicknesses is preferably less than 0.5, particularly preferably even less than 0.3 or even less than 0.2. The first and/or second material is preferably resistant to high-temperature corrosion. In particular, special steel is used.

In accordance with an added feature of the invention, the inner tubular casing part and the outer tubular casing part are connected to one another at least in connection regions. In the present context, a connection is to be understood as meaning in particular a material (cohesive), force-locking and/or form-locking connection. In this context, a material or cohesive connection, in particular a welded and/or brazed connection is preferred. In the present context, the term soldering is to be understood as meaning in particular a hard-soldering (brazing) process, which takes place at high temperatures in vacuo. In particular spot welding, laser welding and/or resistance welding processes, such as roller seam welding, have proven to be advantageous welding processes. With all of these connection processes, it is possible to form connections between the inner and outer tubular casing parts in predetermined subregions. A force-locking connection is one which connects two elements together by force external to the elements, as opposed to a form-locking connection which is provided by the shapes of the elements themselves.

If a honeycomb body according to the invention is used in an exhaust system of an automobile, the honeycomb structure and therefore also the tubular casing are exposed to high thermal gradients and/or transients, which represent considerable loading of the entire system. In order to be able to withstand these loads, it is advantageous for the honeycomb structure and/or tubular casing to be connected either to other parts of the same component or to the respective other component in certain regions and for a connection not to be provided or even to be specifically prevented in other regions. Such systems are often better able to withstand fluctuating thermal stresses than systems which are continuously connected. Therefore, by forming connections in particular only in predetermined subregions, it is possible to provide a tubular casing which is well matched to the fluctuating thermal stresses encountered during use in the exhaust system of a motor vehicle or also of a stationary installation. In particular for mobile applications, the components of the exhaust system are regularly heated and cooled again. The temperature gradients and transients in this case are considerable. Therefore, a honeycomb body and also a tubular casing which are eminently suitable for absorbing the different thermal expansions of the individual components are advantageous. According to the present invention, this can be achieved by only corresponding subregions of the inner and outer tubular casing parts being connected to one another. A connection of this nature allows the thermal properties during subsequent fluctuating thermal stresses to be taken into account or even specifically set even as early as during production of the tubular casing.

In accordance with an additional feature of the invention, a connection region is formed all the way around in the region of an end side of the honeycomb body.

In this context, the term in the region of an end side means in particular directly at the end side of the honeycomb body or also over a range of 10% or even 20% of the length of the honeycomb body adjacent an end side. A connection region all the way around ensures a certain sealing function, so that a bypass flow of the exhaust gas between the inner tubular casing part and the outer tubular casing part is advantageously avoided.

In accordance with yet another feature of the invention, the inner tubular casing part and/or the outer tubular casing part has at least one subregion with at least one embossed formation.

In the present context, an embossed formation is to be understood as meaning a subregion with an altered diameter or radius as compared to the other subregions of the tubular casing. In this case, the material thickness of the tubular casing in the region of the embossed formation may also differ from the material thickness of the remainder of the tubular casing. A subregion with an embossed formation of this type may be formed both in the inner tubular casing part and in the outer tubular casing part. These embossed formations perform various functions. Firstly, they strengthen the material from which the respective tubular casing is formed, so that for the same thickness a tubular casing with embossed formations has a considerable stability advantage over a tubular casing without embossed formations. Secondly, these embossed formations can advantageously perform additional functions. These include firstly the formation of an air gap between the inner and outer tubular casing parts, which can serve as thermal insulation, and secondly also the formation of well-defined connection regions. The outer tubular casing part has, for example, inwardly directed embossed formations between the tubular casing parts, allowing the two tubular casing parts to be connected in a particularly simple way in the region of this embossed formation, for example by spot-welding. On the other hand, an embossed region directed away from the respective other tubular casing part, so as to form an air gap, allows brazing material to be held therein, so that in this case the embossed formations can serve as a type of brazing material reservoir, which ensures that the two tubular casing parts are connected to one another only in certain subregions. If no brazing material is introduced into a gap of this type, the embossed formation can in particular prevent the connection of the inner and outer tubular casing parts, since in this gap the capillary forces which effect distribution of the brazing material when it is liquefied are effectively suppressed.

In accordance with yet a further feature of the invention, at least one connection region is formed by a subregion with an embossed formation in the inner tubular casing part or the outer tubular casing part.

In this case, as explained above, the embossed formation on one hand can serve as a brazing material reservoir and on the other hand in principle can serve as a way of forming a well-defined connection region between the inner and outer tubular casing parts, so that the connection in other subregions with the exception of the embossed formations is suppressed. The formation of well-defined connection regions, however, makes it possible to provide tubular casings having thermal expansion properties which on one hand can be accurately predetermined and which on the other hand can also be adapted to a respective use.

Other features which are considered as characteristic for the invention are set forth in the appended claims.

Although the invention is illustrated and described herein as embodied in a honeycomb body with a double tubular casing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
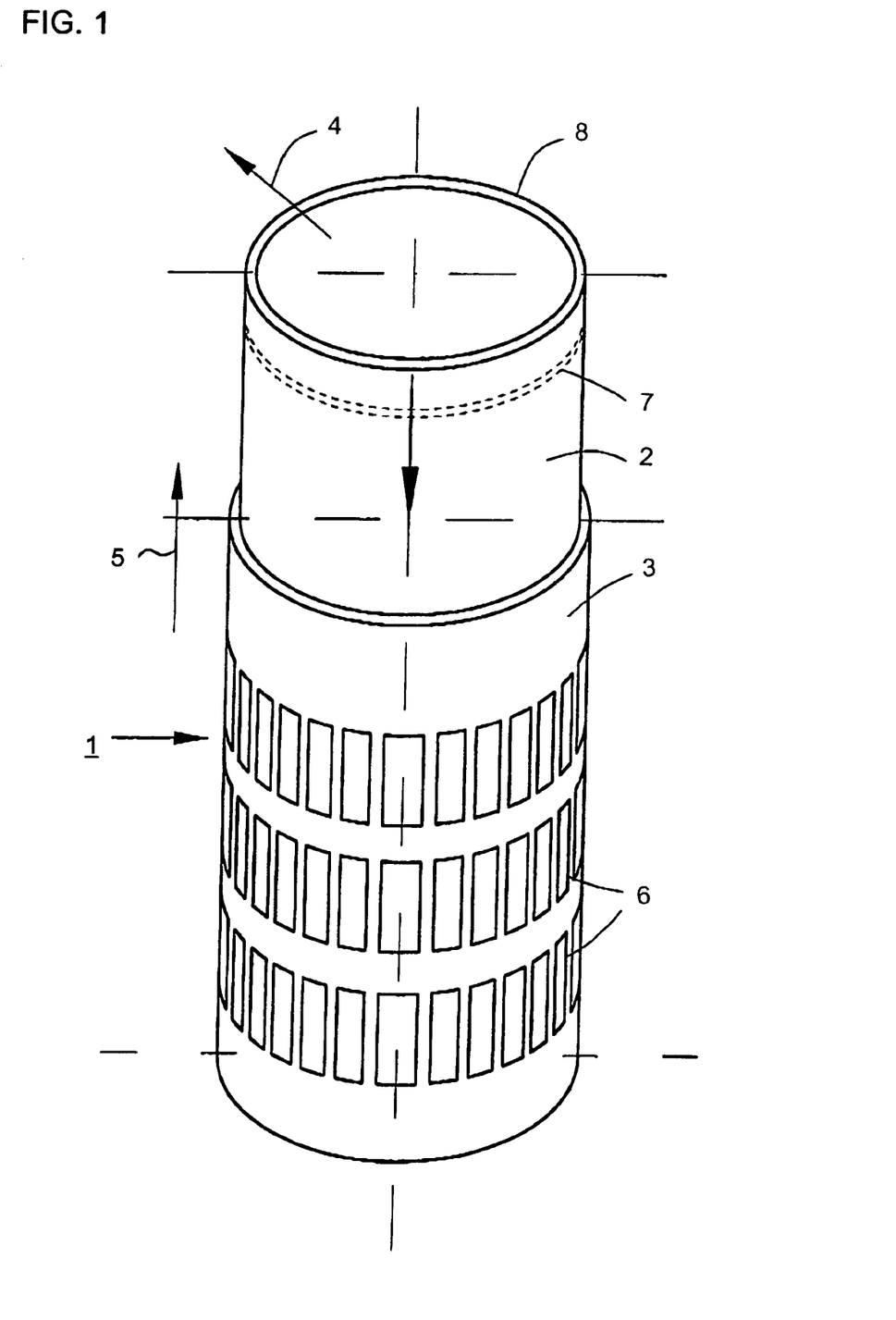
FIG. 1 is a diagrammatic, perspective view of a first exemplary embodiment of a tubular casing according to the invention.

Referring now to the figures of the drawings in detail and first, particularly, to FIG. 1 thereof, there is seen a tubular casing 1 including an inner tubular casing part 2 and an outer tubular casing part 3 for a honeycomb body. This tubular casing 1 surrounds a non-illustrated honeycomb structure through which a fluid can flow. The tubular casing 1 is substantially gas-impermeable in a radial direction 4, which is perpendicular to an axial direction 5. Therefore, a gas can flow through the tubular casing 1 in the axial direction 5, whereas a gas flow in the radial direction 4 is substantially avoided. An illustration in which the inner tubular casing part 2 has not been pushed completely into the outer tubular casing part 3 was selected in FIG. 1 for the sake of clarity. In the finished honeycomb body, the tubular casing parts 2, 3 can completely overlap. It is particularly advantageous if the tubular casing parts 2, 3 overlap at least in an axial subregion in which the honeycomb structure is formed.

In the present exemplary embodiment, the inner tubular casing part 2 is substantially gas-impermeable. The inner tubular casing part 2 is formed in particular from a continuous metal foil that does not have any cutouts. By contrast, the outer tubular casing part 3 does have cutouts 6.

In the present exemplary embodiment, the inner tubular casing part 2 and the outer tubular casing part 3 are connected to one another. In particular, by way of example, there is a force-locking, form-locking and/or material (cohesive) connection between the tubular casing parts 2, 3. It is particularly advantageous to form a connection region 7 in which an in particular material or cohesive connection is present between the two tubular casing parts 2, 3. By way of example, it is possible to form a brazed connection, in particular a high-temperature vacuum soldered (brazed) connection, in the connection region 7. In particular, the connection region 7 is formed in the region of an end side 8 of the honeycomb body, of the inner tubular casing part 2 and/or of the outer tubular casing part 3. In this case, the connection region 7 can perform a sealing function, so that a flow of a gas between the two tubular casing parts and then gradually outward through the cutouts 6 in the outer tubular casing part 3 is avoided. The connection can be made in the connection region 7 by brazing and/or welding or another connection technique. It is particularly advantageous to form a connection by resistance welding processes, such as for example by roller seam welding.

The structure of the tubular casing 1 including the inner tubular casing part 2 and the outer tubular casing part 3 advantageously allows the formation of tubular casings 1 which, although substantially gas-impermeable, are at the same time relatively lightweight. In this case, the inner tubular casing part 2, which is formed without cutouts, allows the honeycomb structure to be closed off in a gas-tight manner in the radial direction 4, while the outer tubular casing part 3 protects the inner tubular casing part 2 and the honeycomb structure from mechanical damage from the outside. For example, it is in particular possible for the inner tubular casing part 2 to be formed with a relatively thin material thickness, while the outer tubular casing part 3 is thicker, so that mechanical damage caused by external actions, such as for example, impact from stones or by a slipping tool or the like, is effectively avoided. In this way it is possible to effectively reduce the weight of the tubular casing 1 compared to a single-layer, unperforated tubular casing with the same mechanical properties and the same properties with regard to gas-tightness. In particular, it has thus been possible for the first time to functionally separate the function of the gas-tightness of a tubular casing 1 and the mechanical protection of a tubular casing 1 and in this way to provide inner tubular casing parts 2 and outer tubular casing parts 3 which are specifically adapted to these respective sub-functions.

In the exemplary embodiment of FIG. 1, the shape of the cutouts 6 is indicated as being rectangular. However, it is equally possible to provide round, oval or polygonal cutouts. The cutouts 6 are in particular openings or apertures. It is also possible for a cutout to simply form a region of reduced material thickness.

It is also possible for the cutouts to be made significantly smaller or larger or for subregions without cutouts to be formed between other subregions with cutouts 6.

Figure 2:
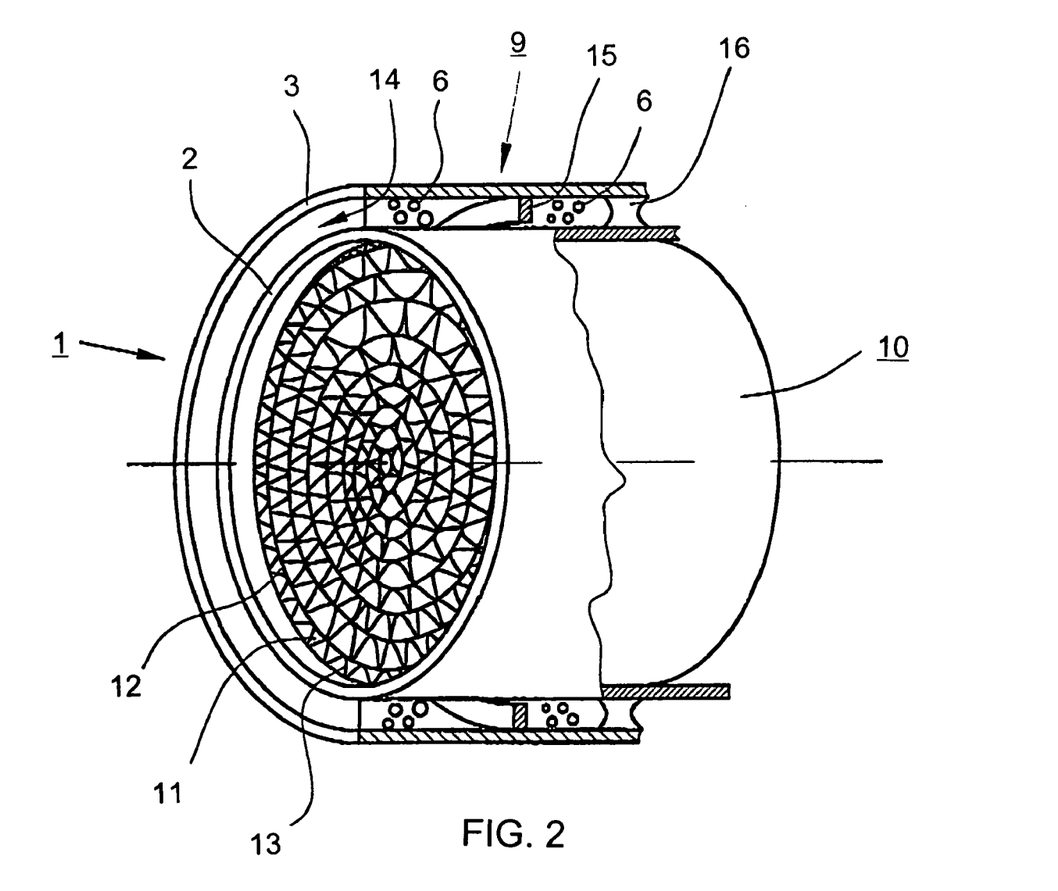
FIG. 2 is a partly broken-away, perspective view of an exemplary embodiment of a honeycomb body according to the invention.

FIG. 2 shows an exemplary embodiment of a honeycomb body 9 according to the invention. The honeycomb body 9 according to the invention includes a honeycomb structure 10 which has passages 11 through which a fluid can flow. In the present exemplary embodiment, these passages 11 are formed by substantially smooth metallic layers 12 and at least partially structured metallic layers 13. Honeycomb structures 10 formed in other ways, such as for example monoliths extruded from ceramic material, are also possible and in accordance with the invention. If the honeycomb structure 10 is formed from layers 12, 13, the invention is not restricted only to the helical winding of one substantially smooth layer 12 and one at least partially structured layer 13 which is illustrated herein. By way of example, it is also possible to form a plurality of stacks from substantially smooth layers 12 and at least partially structured layers 13 and to intertwine one or more of these stacks in the same direction or in opposite directions. In this context, the term substantially smooth means that the substantially smooth layer 12 may have structures, but the amplitude of these structures is considerably smaller than that of the structures of the at least partially structured layer 13.

The honeycomb body 9 has a tubular casing 1 which includes an inner tubular casing part 2 and an outer tubular casing part 3. According to the invention, the outer tubular casing part 3 has cutouts 6 which are shown by way of example in the drawing. The exemplary embodiment shown herein is also distinguished by the fact that there is a cavity 14 between the tubular casing parts 2, 3, with the inner tubular casing part 2 and the outer tubular casing part 3 being separated by spacers 15 and connected to one another by technical joining in connection regions 16. The preferred manner of producing the technical joining connection is by brazing. However, a sintering process or even welding may be used as well.

Figure 3:
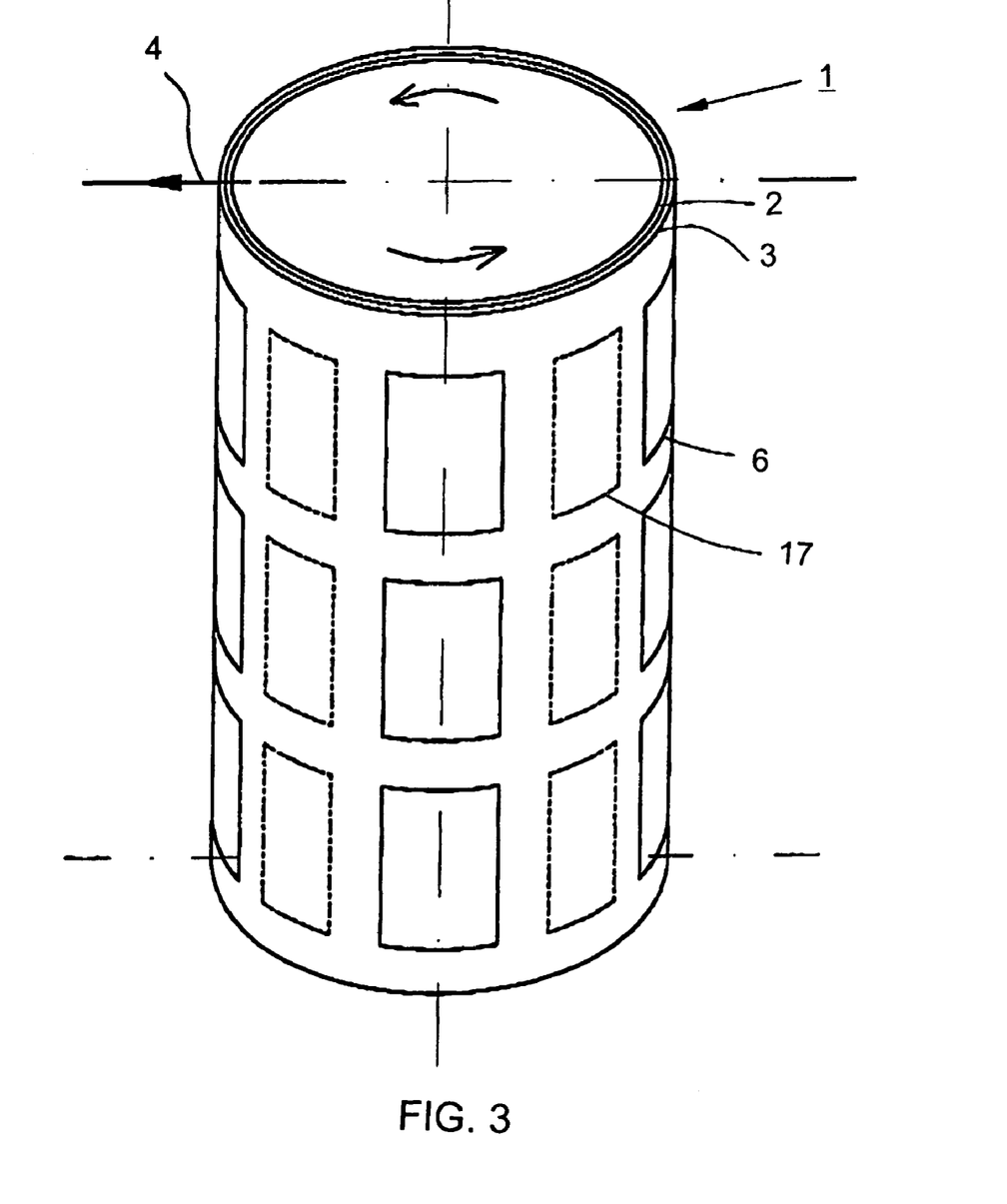
FIG. 3 is a perspective view of a further exemplary embodiment of a tubular casing according to the invention.

FIG. 3 diagrammatically illustrates a tubular casing 1 including an inner tubular casing part 2 and an outer tubular casing part 3. In this exemplary embodiment of the present invention, the tubular casing parts 2, 3 are configured in such a way that there is a minimum possible distance between the inner tubular casing part 2 and the outer tubular casing part 3. The outer tubular casing part 3 has cutouts 6, which are represented by solid lines in the drawing. The inner tubular casing part 2 has cutouts 17 which are indicated by dotted lines in the drawing. The inner tubular casing part 2 is disposed at an angle with respect to the outer tubular casing part 3, which is such that the cutouts 6 and the cutouts 17 do not overlap one another. Therefore, each cutout 6, 17 in one of the tubular casing parts 2, 3 is located opposite a region without a cutout in the other tubular casing part 2, 3. If the inner tubular casing part 2 is then connected to the outer tubular casing part 3, in particular by technical joining, the result is a tubular casing 1 which is substantially gas-impermeable in a radial direction 4. At the same time, the tubular casing 1 is made considerably more lightweight than conventional tubular casings.

Figure 4:
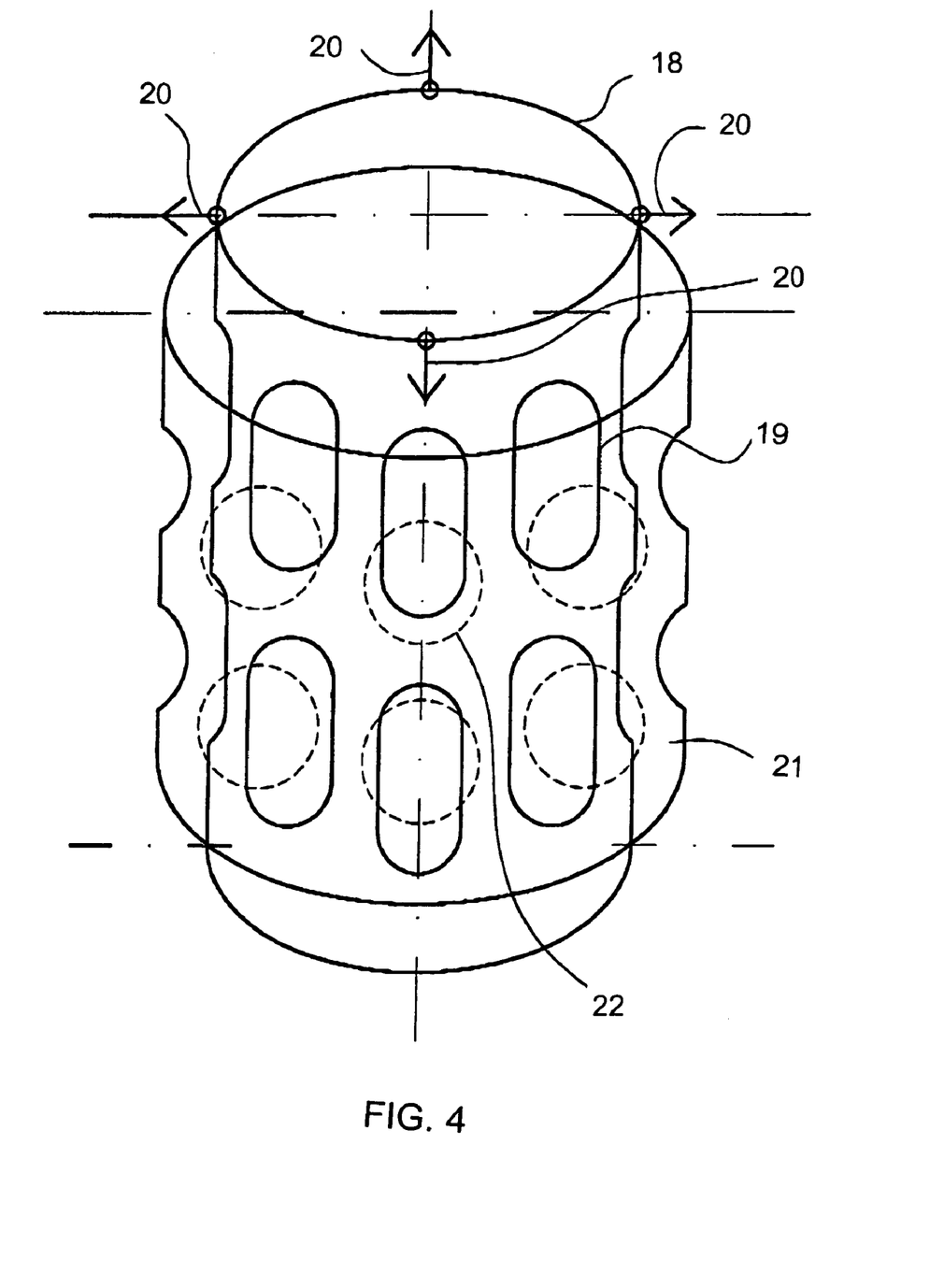
FIG. 4 is a perspective view showing the possibility of producing tubular casings of different diameters from a single tubular casing.

FIG. 4 diagrammatically shows an inner tubular casing part 2 or an outer tubular casing part 3 in two different states. When producing honeycomb bodies, it is often necessary to produce honeycomb bodies, and therefore also tubular casings, of different diameters. The present invention also allows the provision of tubular casings 1 with a diameter which varies in regions, yet which are nevertheless substantially gas-impermeable and mechanically stable. In this case, first of all a tubular casing part 18, which may be an inner tubular casing part 2 or an outer tubular casing part 3 in a tubular casing 1, is produced in a first state, which has cutouts 19 of a first shape. Deformation of the tubular casing part 18 in the first state in a direction 20 converts the tubular casing part 18 in the first state into a tubular casing part 21 in a second state. The tubular casing part 21 in the second state has cutouts 22 of a second shape. In the present exemplary embodiment, oval cutouts 19 of a first shape were converted into substantially round cutouts 22 of the second shape. Any other change in shape caused by converting a tubular casing part 18 in the first state into a tubular casing part 21 in the second state is also possible and in accordance with the invention. In particular, in this way it is possible to produce tubular casing parts 18, 20 with different diameters. In this way it is advantageously possible to reduce the stock-keeping requirements and tool configuration in a factory for producing honeycomb bodies, since in this way a relatively large number of tubular casing parts 21 in the second state can be produced using fewer basic shapes of tubular casing parts 18. It will be understood that both inner tubular casing parts 2 and outer tubular casing parts 3 can be produced in a corresponding way.

Figure 5:
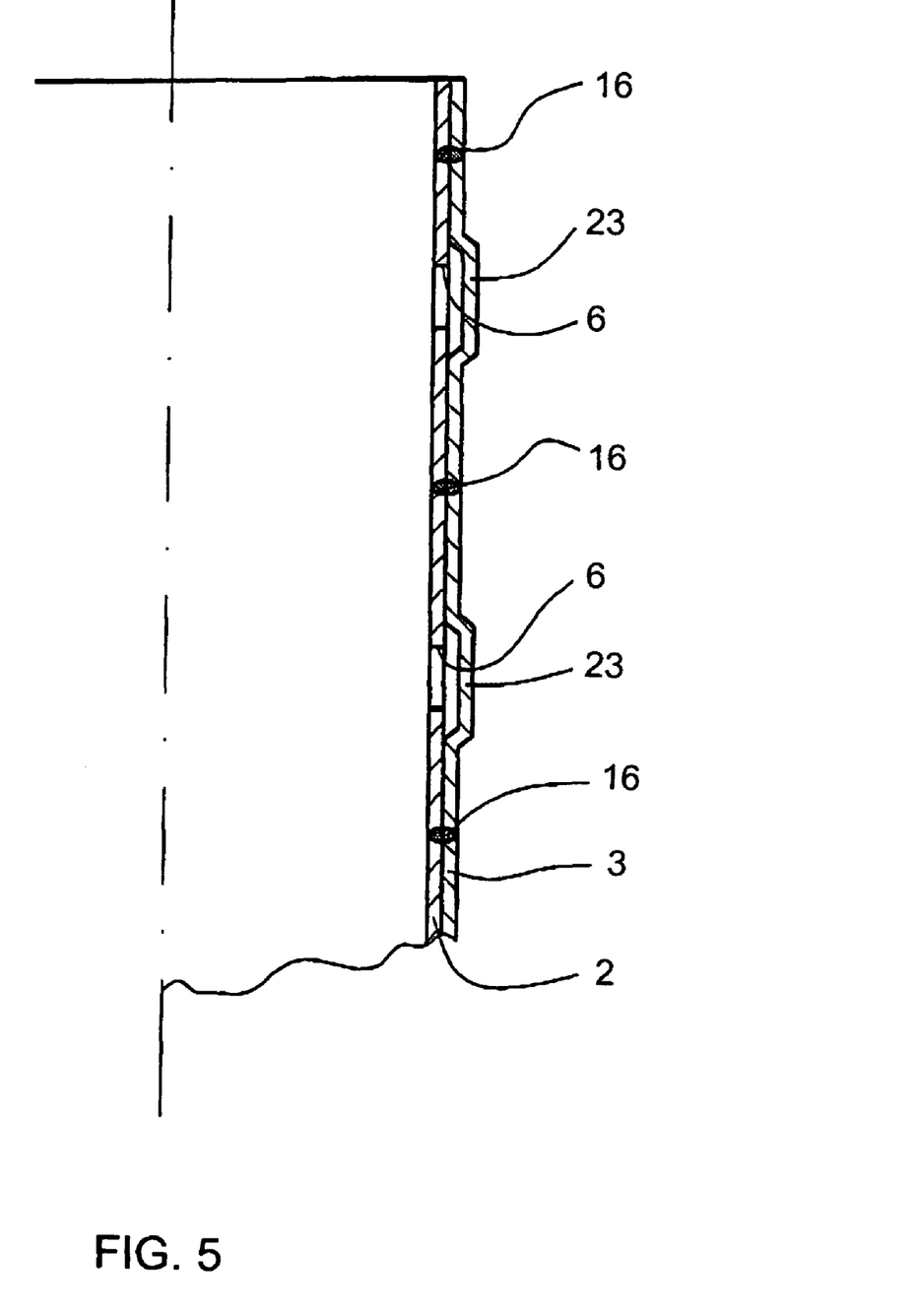
FIG. 5 is a fragmentary, longitudinal-sectional view of a further exemplary embodiment of a tubular casing.

FIG. 5 diagrammatically illustrates a portion of a further embodiment of a honeycomb body 9 according to the invention. This honeycomb body 9 includes an inner tubular casing part 2 and an outer tubular casing part 3, which are connected to one another in connection regions 16. The inner tubular casing part 2 has cutouts 6. The outer tubular casing part 3 has embossed formations 23. An embossed formation is to be understood as meaning a region of a tubular casing part 2, 3 in which the radius of the tubular casing part 2, 3 has been altered, i.e. is smaller than in adjacent regions of the tubular casing part 2, 3 or is larger than those regions. In the present exemplary embodiment, the embossed formations 23 have a larger diameter or a larger radius than the remaining regions of the outer tubular casing part 3. The configuration of a tubular casing 1 with an inner tubular casing part 2 and an outer tubular casing part 3, with the inner tubular casing part 2 or the outer tubular casing part 3 having embossed formations 23, is also possible independently of the formation of cutouts 6 in the inner tubular casing part 2 and/or the outer tubular casing part 3. The embossed formations 23 on one hand improve the thermal insulation provided by the honeycomb body in the region of the embossed formations 23, and therefore reduce the dissipation of heat from the honeycomb body to the outside. On the other hand, however, embossed formations of this type also reinforce the foil from which the respective tubular casing part 2, 3 is formed. Therefore, given a suitable construction of the embossed formations 23, it is possible to form inner tubular casing parts 2 and/or outer tubular casing parts 3 which have the same mechanical stability as a corresponding tubular casing part 2, 3 made from thicker material without embossed formations 23. Consequently, double tubular casings 1 including an inner tubular casing part 2 and an outer tubular casing part 3 with corresponding embossed formations 23 can also be used to produce tubular casings 1 which, while achieving the same degree of stability, have a lower weight than corresponding conventional tubular casings 1.

Figure 6:
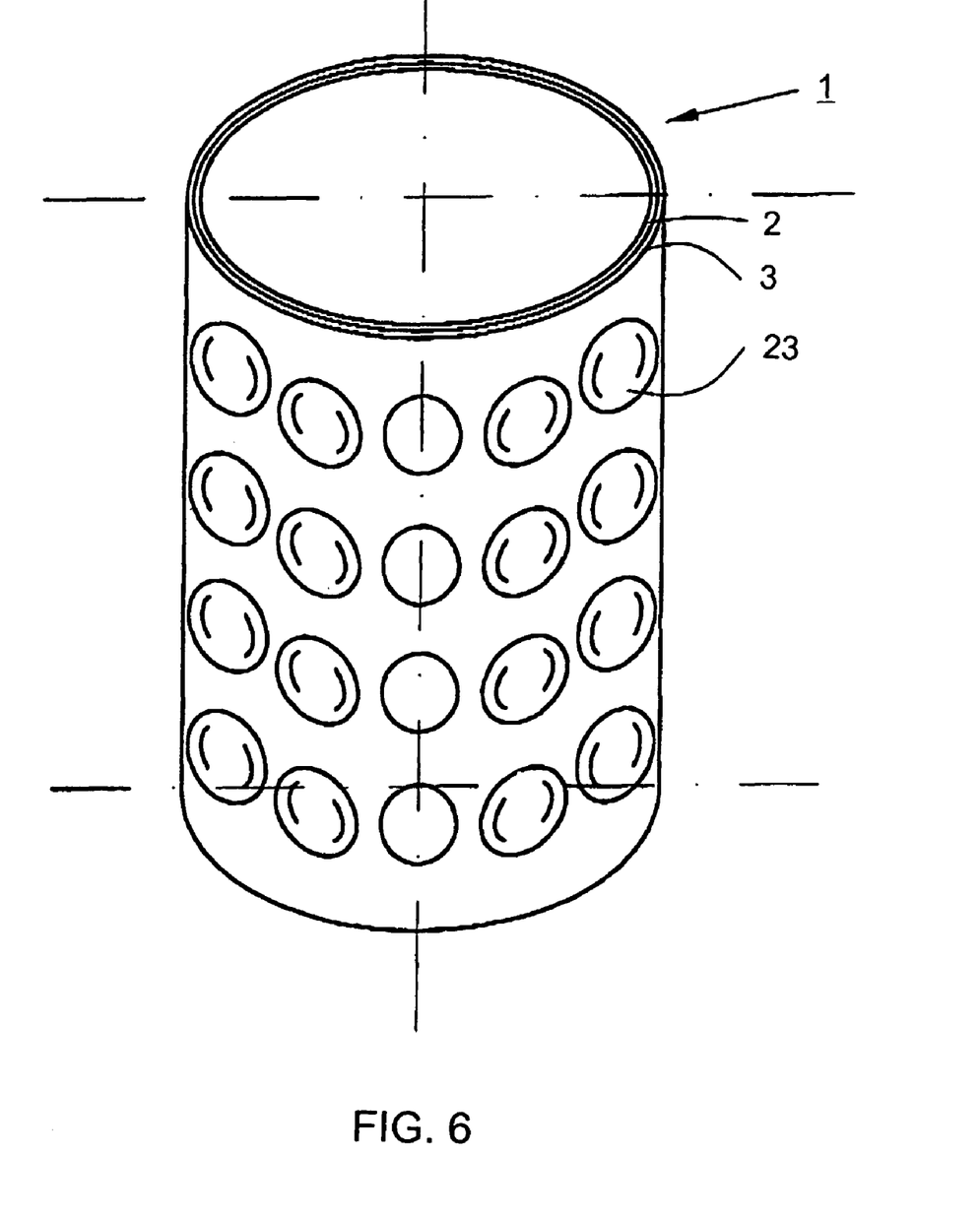
FIG. 6 is a perspective view of the exemplary embodiment of the tubular casing of FIG. 5.

FIG. 6 shows a correspondingly formed tubular casing 1. The inner tubular casing part 2 in the present exemplary embodiment may have cutouts 6 or may be continuous without any cutouts. The outer tubular casing part 3 has embossed formations 23. These embossed formations 23 protrude outward and strengthen the outer tubular casing part 3. At the same time, the embossed formations 23 can serve as a brazing material reservoir, in which case brazing material is introduced into at least some of the embossed formations 23 and then leads to a well-defined attachment of the two tubular casing parts 2, 3 to one another when the inner tubular casing part 2 and the outer tubular casing part 3 are slid into one another. In this way it is possible to produce double-walled tubular casings 1 which are connected to one another in defined subregions. In this way it is also possible in particular to very accurately predetermine and direct the thermal expansion properties of the tubular casing 1. It is thus possible to produce honeycomb bodies, the tubular casings 1 of which are well matched to the respective intended use and which have a better durability than corresponding conventional products.

Figure 7:
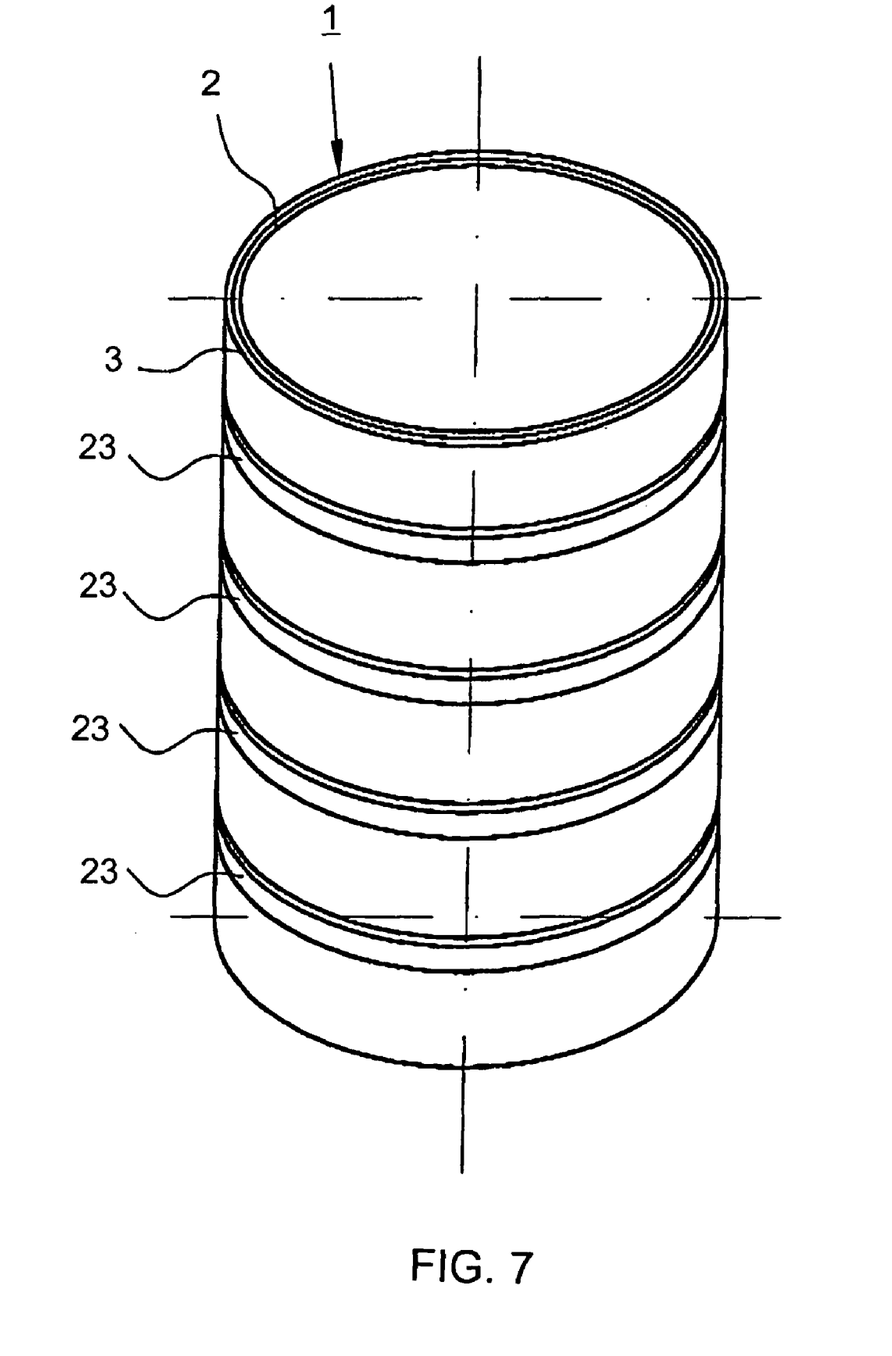
FIG. 7 is a perspective view of a further exemplary embodiment of a tubular casing.

FIG. 7 diagrammatically illustrates a similar example of a tubular casing 1. In the present example, the outer tubular casing part 3 has embossed formations 23 which are formed in the shape of barrel rings. The embossed formations 23 perform substantially the same functions as the stud-shaped embossed formations described above in connection with FIG. 6. When forming embossed formations 23 in the shape of barrel rings or stud-shaped embossed formations 23 which extend inward from the outer tubular casing part, it is possible to improve the thermal insulation properties of the tubular casing 1 by utilizing an air gap formed by the subregions without embossed formations 23 for insulation purposes. This reduces the extent to which heat is radiated outward from the honeycomb body 9 and allows the light-off temperature to be reached more quickly if the honeycomb body is used in the exhaust system of a motor vehicle or a stationary internal combustion engine during a cold start.

Figure 8:
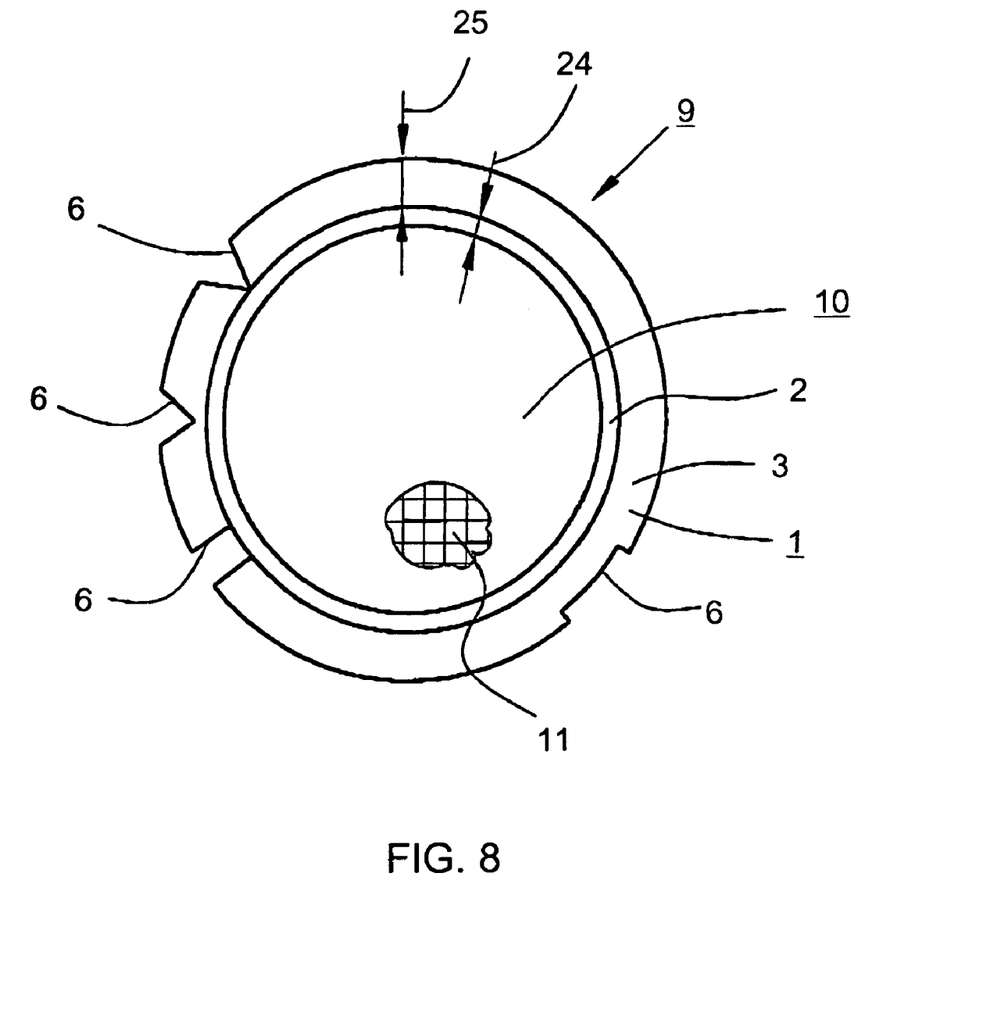
FIG. 8 is a cross-sectional view of a further exemplary embodiment of a honeycomb body according to the invention.

FIG. 8 diagrammatically shows a honeycomb body 9 according to the invention in cross section. This honeycomb body 9 has a honeycomb structure 10 with passages 11, which for the sake of clarity are only shown in part of the cross section of the honeycomb structure 10, that is constructed as a ceramic extrudate. The honeycomb structure 10 is held in a tubular casing 1 which includes an inner tubular casing part 2 of a first material thickness 24 and an outer tubular casing part 3 of a second material thickness 25. A quotient of the first material thickness 24 and the second material thickness 25 is less than 1, in particular, even less than 0.5 or even less than 0.2.

The outer tubular casing part 3 has a plurality of cutouts 6, which are distributed asymmetrically over the outer tubular casing part 3 and have different shapes. In addition to continuous openings with edges which are parallel in section, regions with a reduced material thickness with a rectangular or triangular cross section are also shown. Other forms of cutouts 6 or openings are also possible. The asymmetric distribution of the cutouts 6 over the outer tubular casing part 3 can, for example, be formed in a region of the outer tubular casing part 3 which is exposed to high levels of risk during operation, for example from the impact of stones, having fewer cutouts 6 than a region of reduced risk. By way of example, the underside of a honeycomb body 9 could have fewer cutouts 6 in the outer tubular casing part 3 than the top side of the honeycomb body 9.

A honeycomb body 9 according to the invention has a tubular casing 1 of reduced weight as compared to standard tubular casings, yet nevertheless has the same mechanical stability and gas-tightness. In particular, it is possible to form tubular casings 1 having thermal expansion properties which are adapted to subsequent use.

This application claims the priority, under 35 U.S.C. §119, of German Patent Application 10 2005 017 725.5, filed Apr. 15, 2005; the entire disclosure of the prior application is herewith incorporated by reference.

I claim:

1. A honeycomb body, comprising:
   a tubular casing being substantially gas-impermeable in a radial direction and including at least one inner tubular casing part and at least one outer tubular casing part, said inner tubular casing part and said outer tubular casing part having cutouts formed at least in a subregion;
   the cutouts of said inner tubular casing part and the cutouts of said outer tubular casing part are not overlapping; and
   a honeycomb structure through which a fluid can flow, said honeycomb structure being disposed in said tubular casing.

2. The honeycomb body according to claim 1, wherein said honeycomb structure includes at least one at least partially structured metallic layer.

3. The honeycomb body according to claim 1, wherein said at least one inner tubular casing part and said at least one outer tubular casing part are connected to one another at least in connection regions.

4. The honeycomb body according to claim 3, wherein one of said connection regions is formed all the way around in a region of an end side of the honeycomb body.

5. The honeycomb body according to claim 1, wherein at least one of said at least one inner tubular casing part or said at least one outer tubular casing part has at least one subregion with at least one embossed formation.

6. The honeycomb body according to claim 1, wherein said at least one inner tubular casing part and said at least one outer tubular casing part are connected to one another at least in at least one connection region formed by a subregion with an embossed formation in at least one of said at least one inner tubular casing part or said at least one outer tubular casing part.

7. The honeycomb body of claim 1, wherein said at least one inner tubular casing part has a first material thickness, said at least one outer tubular casing part has a second material thickness, and a quotient of said first material thickness and said second material thickness is less than 1.

* * * * *